UNITED STATES PATENT OFFICE.

JOHN M. WILSON, OF MONTCLAIR, NEW JERSEY, AND HENRY A. HARRIS, OF LONG ISLAND CITY, NEW YORK.

PAINT, VARNISH, AND FINISH REMOVER.

1,046,926.

Specification of Letters Patent. Patented Dec. 10, 1912.

No Drawing. Application filed September 11, 1911. Serial No. 648,624.

*To all whom it may concern:*

Be it known that we, JOHN M. WILSON and HENRY A. HARRIS, citizens of the United States, residing in Montclair, county of Essex, and State of New Jersey, and Long Island City, county of Queens, and State of New York, respectively, have invented new and useful Improvements in Paint, Varnish, and Finish Removers, of which the following is a specification.

This invention relates to improvements in so-called paint, varnish and finish removers of the type which contain highly volatile finish solvents, and particularly relates to the solid ingredients which are introduced into such removers for thickening and film-forming purposes.

Heretofore various waxes of a mineral or animal nature such as paraffin wax, ceresin wax and bees-wax have been commonly employed in conjunction with such volatile finish solvents as alcohol or acetone and benzol, as for example, the removers described in the patent to John M. Wilson #872,314, granted November 26th, 1907. These waxes are relatively soft, and also of a greasy and adhesive nature, and on the evaporation of the associated volatile solvents, which allow partial re-drying of the gums, they deposit on the surface of trim, over which the remover has been spread, and which greasy-gum deposit prevents the drying of new paint and varnish and induces "blistering" of the new coats if not thoroughly scrubbed and cleaned by a clear wax gum solvent as for example benzene and alcohol. It may be admitted that such mineral and animal waxes are of temporary benefit in remover, with their usefulness confined to retarding the drying of volatile solvents such as benzole, alcohol and ketones. It is also an established fact that these waxes prevent re-drying of old solved varnish and induce gumminess, which combination becomes a menace to fresh coats of paint or varnish applied over the same surface. These gummy-waxy grease deposits accumulate in cracks, porous wood and carvings, all of which act as catch basins for them and because of their adhesive and plastic nature become exceedingly difficult and expensive to clean, and are often unwittingly left behind. The aforesaid nature waxes also form an imperfect film and liberates the volatile solvents to the extent of making fluid removers of this class very expensive to use and very inefficient as solvents of paint. It is also a fact that if these coatings or deposits of waxy-gum grease are not scrupulously cleaned, they necessitate re-stripping of the entire surface to rid it of the non-drying residue adhering to the wood or metal. These waxes can therefore be considered only a convenient makeshift or temporary expedient, and although quite universally utilized, their employment in remover is justified only by the failure to have discovered a more suitable film-forming agent.

The separation and prompt precipitation of waxes of the aforesaid type in the presence of alcoholic or ketonic bodies limits their efficiency in another direction, viz. film-forming. By this precipitation the highly volatile cutters are allowed to escape into the atmosphere from open pots during use and from the surface treated on the application of the remover thereto. This wastefulness makes the use of remover prohibitive in many instances, particularly when subjected to the out-of-door elements. The deleterious odors passing off also effect the eyes and in some cases the sensorial system of the workmen, producing temporary blindness and dizziness. These fumes have been known to prostrate workmen and render them unconscious. It is fundamentally important, therefore, to the art that the unscientific crudeness and unfinished condition of these wax bearing removers be overcome, and the wax displaced by solids which meet all practical and chemical requirements.

To be thoroughly practical a paint and varnish remover must be entirely free from waxes of the aforesaid type and possess an amenable solid or solids, that will instantly form a perfect non-porous film, to prevent the escape of the volatile cutters. Such new solid must also be of such a nature that if deposited on wood or metal will not interrupt the drying of new coats of paint or varnish, or have any chemical action thereon afterward. The sludge or resultant must lift readily and be permanently free from gumminess or stickiness.

We have cited the imperfections and faultiness common to all wax bearing removers heretofore produced, and also indicated the demand that has been gradually created but so far unsatisfied, for a perfect commercial paint and varnish solvent. We have shown the unbalanced condition of the present formulæ, that while one class of their ingredients are highly efficient if used under proper conditions, the other class of associate ingredients are the opposite and worse. The need of improvement is therefore manifest to overcome the prejudice against wax and to place remover on a more economical and practical basis for the consumer, to wit: (1) to effect the economy in manual labor by eliminating much of the work now found necessary due to wax deposits (2) to maintain as constant a relative proportion of the volatile solvents (3) by increasing cutting efficiency (4) to minimize the number of applications and reduce the present necessary gallonage of removers per superficial foot of trim (5) to minimize the harmless effect of escaping poisonous fumes on workmen (6) to abolish the scrubbing of surfaces following the use of remover, which irritation raises the grain of the wood, often discoloring it and making sanding a perfunctory and an added expense, (7) and to insure against the possibility of complete failure of the new coats of varnish or paint because of tackiness due to non-drying. The delinquencies of previously known wax-bearing removers are indisputably serious and energetically call for a change in the construction of removers to avoid the present difficulties experienced in the use of them which often make the cure worse than the disease.

Our invention relates to the discovery that a vegetable substance which exudes from or is secreted by the Mexican candelilla plant, possesses several very important advantages over the usual waxes employed in finish removers, and avoids all of the objections above described, which are possessed by paraffin wax, ceresin wax, bees-wax and the like. This substance, hereinafter termed "candelilla solids" possesses a specific gravity of approximately .97, a melting point of about 165° F., and acidity of 15%. Said candelilla extracts or "candelilla solids" show a non-saponifiable matter of 77% and contain about 50% of hydrocarbons, and iodin value about 17%. It is soluble in turpentine more readily than is carnauba wax, and the water content is only about 3% to 5%, whereas as is well known carnauba wax posessses a water content of approximately 10%. It has also a lower shrinkage value on melting than carnauba wax, but when melted is more viscous than said carnauba wax. Its color varies from light greenish-yellow to almost chocolate-brown, and it can be readily bleached. It is about the same hardness as carnauba wax, but is harder and much more brittle than bees-wax. In fact it can be readily shattered by a blow from a hammer. It is also soluble in benzol and many other solvents of the previously mentioned waxes and is precipitated from such solvents, particularly benzol in the form of an almost perfect milky like emulsion, by wood alcohol or acetone or mixtures of these, or similar precipitants.

The above described finish remover containing acetone (alcohol) benzol, candelilla solids, phenol and nitro-cellulose, is of a consistency of a semi-paste, whereby the same is not only rendered extremely easy of application, either by means of a brush, but also by means of the pneumatic method of application described in said patent to John M. Wilson, of November 26th, 1907, and it will also stand on vertical and over-head surfaces without running off therefrom. It is also extremely rapid in action, being equally efficient upon either paint or varnish, and is correspondingly slow in drying. Moreover, all stickiness or gumminess of the residue or solid obtained from the action of these removers upon coats of paint and varnish is absent. This extract of the candelilla plant possesses to a remarkable degree all the physical and chemical non-greasy substance desired in remover as a thickener coupled with the elements essential to a perfect film former, and that it cleans easily and carries in its wake no bad after effects to endanger the stability of the new coats of paint or varnish following the use of remover containing it.

Candelilla extract or "candelilla solids" is shown to differ from the aforesaid animal or mineral waxes in that it is not perceptibly greasy either to the touch or in appearance, by which we mean that varnish or paint can be applied in the usual manner to the pure solidified extract and that both will dry and harden in the same time as when spread over wood, an experience totally impossible with wax. The natural acidity of the "candelilla solids" also appears to augment the cutting action of the removers on paint and other finish. These candelilla solids are particularly desirable in remover carrying phenol as a solvent, and assistant film producer and paint solvent, on which candelilla extract serves to neutralize and minimize the mendacious action of the phenol on the skin even if phenol is used in large proportions. Another characteristic property of the candelilla solid is that it seems to be inert toward fresh coats of varnish directly applied to the candelilla solids itself, and the said varnish will dry and harden in the usual manner without being apparently affected thereby.

In order to produce a commercial paint and varnish and finish remover, embodying our invention, we proceed as follows:—6 oz. of "candelilla solids", which as above stated, is now commercially sold as candelilla wax, is first heated until melted. Into this mixture is added approximately 45 oz. of benzol. A second mixture is prepared by dissolving 4 oz. of collodion, containing approximately 7½ oz. of nitrated cellulose and 92½% of volatile solvents (such as alcohol and ether or alcohol and amyl acetate) in 45 oz. of acetone, to which is added 12 oz. of crystalline phenol or carbolic acid. When the said phenol is thoroughly dissolved in the acetone and collodion mixture, this second mixture is added to the first mixture, preferably after cooling said first mixture below 100° F. The said finish remover may also be prepared by employing substantially the same proportions of ingredients as above stated but by first melting the "candelilla solids" then boiling the same with phenol, and when somewhat cool adding the collodion. To this amorphous mass is then added a mixture consisting of alcoholic or ketonic solvent and benzol. A remarkably and totally unexpected result is obtained by employing the "candelilla solids" aforesaid with phenol, which latter, as is well known, normally possesses quite an energetic action upon the human cuticle. While ordinarily if more than a small amount (viz: not over 5%) of phenol is used in finish removers, such as those containing the waxes previously stated, the action of the phenol upon the cuticle of the operator is extremely active and irritating and therefore often objectionable. We have discovered, that when associated with these "candelilla solids" the action of the phenol toward the human cuticle is remarkably neutralized if not wholly prevented, and in fact rendered almost inert even when as high as 32 oz. of carbolic acid crystals are employed in a total of 112 oz. of finish remover, and said mixture when applied to the cuticle on the inside of the wrist for a period of approximately five minutes, produces no serious or even a scarcely objectionable effect, not even to the extent of blistering the cuticle.

When employing large amounts, i. e., 10%, of phenol, which is the proportion in the above formulæ, the mixture can be applied to the cuticle on the inside of the wrist in the manner above stated without even noticeable effects, and at the same time all the active and valuable properties of the phenol for paint and varnish removers are retained, and apparently unaffected by said "candelilla solids".

Particular attention is drawn to the great advantages of phenol in remover: (1) It is indisputably one of the most powerful and active finish solvents known. (2) It is also efficient on varnish and disintegrates or decomposes the gums and renders them non-elastic or unadhesive, in which respect it is of great value. (3) If used in substantial proportions it materially reduces inflammability and the consequent fire risk. (4) Owing to its non-volatile and deliquescent nature it is a most valuable assistant for film-forming purposes and substantially prolongs the wetness of the resultant sludge. We have discovered that candelilla extract neutralizes in a great measure these objectionable features of phenol for remover purposes, prevents crystallization and separation, and allows of its use in the large proportions set forth, without any objectionable odor being readily perceptible and withal, while the phenol is made comparatively harmless to the skin, the candelilla extract does not appreciably reduce its efficiency otherwise. The employment of candelilla will, therefore, make the heretofore so-called carbolic acid removers, the most comprehensive of all removers in their scope of usefulness, and relieve them of all practical or commercial objections. They will supplant the use of the dangerous fire torch for removing paint and permit of the application of remover by the said pneumatic method as distinguished from hand brushing which is very detrimental and wasteful to remover because of the surface agitation by the brush and the consequent breaking of film and liberation of the volatile solvents. This extravagant feature is largely overcome by the candelilla-phenol-nitro-cellulose formulæ, which instantly forms a heavy glassy film, reducing the evaporation thereof from open pots or during application to surfaces. Another important development found in this mixture is the smooth colloidal or non-granular condition in which it exists. These functions of candelilla extract in combination with phenol and nitro-cellulose as described, are considered discoveries and invention of great importance to removers and mark a new era of increased usefulness and economy for them to the consumer not heretofore enjoyed.

In the claims the expression "volatile finish solvents" includes the various alcohols, such as grain alcohol, wood alcohol, amyl alcohol, and the like, and other well known alcohols, which may be suitable for this purpose, owing to their having equivalent properties; also the various ketones, including acetone, and also various hydrocarbons, including benzol, toluol, and the like, and other solvents having similar properties. The expression "film-forming colloid" includes "candelilla solids" and also other waxy or solid substances having the properties claimed for "candelilla solids." When not otherwise associated with limitations as to its properties, nitrated cellulose such as gun-cotton, as well as certain other similar colloids which may be considered equivalent thereto, and also included in said expression.

As an equivalent to "candelilla solids"

herein described, we intend to include within the spirit of this invention, similar bodies having the properties corresponding to those set forth in the claims, and which bodies are suitable for use in removers in the manner in which the "candelilla solids" are employed.

Having thus described our invention, what we claim and desire to secure by Letters Patent is:—

1. A finish remover comprising a colloidal stiffening material and volatile finish solvents including a solvent and a precipitant of said material, the said colloidal stiffening material being in its natural isolated condition of a relatively brittle nature, not perceptibly greasy either to the touch or in appearance and substantially inert toward a coat of varnish when directly applied thereto and being capable of forming a non-crystalline milk-like emulsion when precipitated from its solution in benzol by acetone, which emulsion is substantially permanent and shows no substantial settling tendency after long periods of time have elapsed when so precipitated.

2. A finish remover comprising a colloidal stiffening material and volatile finish solvents including a solvent and a precipitant of said material, the said colloidal stiffening material being in its natural isolated condition of a relatively brittle nature, not perceptibly greasy either to the touch or in appearance and substantially inert toward a coat of varnish when directly applied thereto, being capable of materially neutralizing the action of phenol when in solution in acetone and benzol upon the human cuticle, and being capable of forming a non-crystalline milk-like emulsion when precipitated from its solution in benzol by acetone which emulsion is substantially permanent and shows no substantial settling tendency after long periods of time have elapsed when so precipitated.

3. A finish remover comprising a colloidal stiffening material and volatile finish solvents including a solvent and a precipitant of said material, the said colloidal stiffening material having substantially the same reaction with said finish solvents as candelilla wax and being in its natural isolated condition of a relatively brittle nature, not perceptibly greasy either to the touch or in appearance and substantially inert toward a coat of varnish when directly applied thereto and being capable of forming a non-crystalline milk-like emulsion when precipitated from its solution in benzol by acetone, which emulsion is substantially permanent and shows no substantial settling tendency after long periods of time have elapsed when so precipitated.

In witness whereof, we have hereunto set our hands at the city, county and State of New York, this 9th day of September, 1911.

JOHN M. WILSON.
HENRY A. HARRIS.

Witnesses:
CLARENCE J. WYCKOFF,
W. H. SWENARTON.